United States Patent
Bagger

(10) Patent No.: US 9,515,695 B2
(45) Date of Patent: Dec. 6, 2016

(54) BYPASSING DUPLEX FILTER

(71) Applicant: Oluf Bagger, Aalborg (DK)

(72) Inventor: Oluf Bagger, Aalborg (DK)

(73) Assignee: Intel Deutschland GmbH, Neubiberg (DE)

( * ) Notice: Subject to any disclaimer, the term of this patent is extended or adjusted under 35 U.S.C. 154(b) by 435 days.

(21) Appl. No.: 13/627,114

(22) Filed: Sep. 26, 2012

(65) Prior Publication Data

US 2014/0086109 A1  Mar. 27, 2014

(51) Int. Cl.
*H04B 1/44* (2006.01)
*H04B 1/48* (2006.01)
*H04B 1/525* (2015.01)

(52) U.S. Cl.
CPC .............. *H04B 1/48* (2013.01); *H04B 1/525* (2013.01)

(58) Field of Classification Search
USPC ...... 370/278, 282, 276, 281; 455/78, 79, 83, 455/63.1, 73, 82, 296, 307
See application file for complete search history.

(56) References Cited

U.S. PATENT DOCUMENTS

| | | | | |
|---|---|---|---|---|
| 8,891,412 | B2* | 11/2014 | Tikka | H04B 1/0057 370/278 |
| 2005/0215204 | A1* | 9/2005 | Wallace et al. | 455/78 |
| 2009/0003286 | A1* | 1/2009 | Korden et al. | 370/335 |
| 2010/0309825 | A1* | 12/2010 | Zhang | 370/278 |
| 2012/0195237 | A1* | 8/2012 | Chan | H04B 1/44 370/278 |
| 2013/0003617 | A1* | 1/2013 | Gudem | H04B 1/109 370/277 |

(Continued)

FOREIGN PATENT DOCUMENTS

| | | |
|---|---|---|
| DE | 102004049684 A1 | 4/2006 |
| EP | 1275205 A2 | 1/2003 |
| WO | WO 0180436 A2 * | 10/2001 |

OTHER PUBLICATIONS

Duplexer entry, Sep. 17, 2008, Telecommunications: Glossary of Telecommunication Terms (via wayback machine web.archive.org/web/20080917092720/http://www.its.bldrdoc.gov/fs-1037/dir-013/_1848.htm), whole document.*

(Continued)

*Primary Examiner* — Hanh N Nguyen
*Assistant Examiner* — Jose L Perez
(74) *Attorney, Agent, or Firm* — Eschweiler & Associates, LLC

(57) ABSTRACT

The disclosed invention relates to a transceiver system having a bypass signal path that enables low power consumption. The transceiver system has transmission path and a reception path. The transmission path provides a signal from a transmission chain to an antenna for wireless transmission. The reception path provides a signal from the antenna to a reception chain. A duplex filter that provides isolation between the transmission and reception paths is connected between the antenna and the transmission and reception paths. A bypass signal path selectively exchanges signals between the transmission chain and the antenna along a conductive path that bypasses the duplex filter. By using the bypass signal path to selectively exchange signals between the transmission chain and the antenna the insertion loss of the duplex filter can be mitigated, allowing for the transceiver system to operate at a lower power.

15 Claims, 5 Drawing Sheets

(56) References Cited

U.S. PATENT DOCUMENTS

2013/0043946 A1* 2/2013 Hadjichristos et al. ...... 330/252
2013/0273860 A1* 10/2013 Pehlke .................. H04B 1/525
                                                                                          455/78

OTHER PUBLICATIONS dictionary.com, entry for periodic, www.dictionary.com/browse/periodic, whole document.*
dictionary.com, entry for regular, www.dictionary.com/browse/regular, whole document.*
thesaurus.com, entry for regular, www.thesaurus.com/browse/regular, whole document.*
Office Action dated Jun. 26, 2014 German Patent Application No. 10 2013 109 692.1.

* cited by examiner

BYPASSING DUPLEX FILTER

BACKGROUND

Transceivers are widely used in many modern wireless communication devices (e.g., cell phones, wireless sensors, PDAs, etc.). Transceivers are able to transmit and receive electromagnetic radiation using an antenna. Some transceivers are able to operate as full duplex systems, which transmit and receive data at a same time.

FIG. 1 illustrates a transceiver 100 that can operate as a full duplex system. The transceiver 100 comprises a transmission path 102 and a reception path 108. The transmission path 102 comprises a power amplifier 110 that is configured to provide a signal having a first frequency $S(f_1)$ within a transmission band-width to an antenna 106. The reception path 108 comprises a low noise amplifier 112 that is configured to receive a received signal having a second frequency $S(f_2)$ within a reception band-width from the antenna 106. A duplex filter 104 is located between the transmission and reception paths, 102 and 108, and the antenna 106. The duplex filter 104 is configured to isolate the transmission path 102 from the reception path 108.

The duplex filter 104 comprises a first bandpass filter 104a and a second bandpass filter 104b. The first bandpass filter 104a attenuates noise outside the transmission band-width (e.g., thermal noise input to power amplifier 110 in the transmission path and noise from the power amplifier) from the transmission path 102 before it gets to antenna 106. The second bandpass filter 104b suppresses signals outside the reception band-width including the transmitted signal $S(f_1)$ before it gets to the reception path 108. Without the duplex filter 104 the noise and signal from the transmission path 102 may leak into reception path 108, reducing the signal-to-noise ratio and increasing the dynamic range requirements for the receiver.

DETAILED DESCRIPTION

Figure 1:
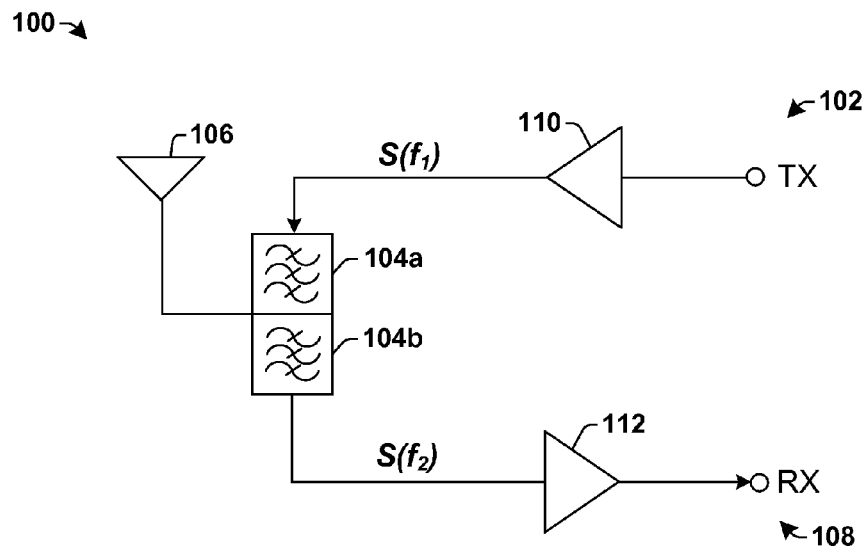
FIG. 1 is a block diagram illustrating a transceiver with a duplex filter configured to provide isolation between a transmission path and a reception path.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

In many modern wireless communication standards, mobile communication devices must be capable of operating in full duplex mode to maintain tight transmitted power control. For example, in 3G systems such as WCDMA and CDMA2000, a transceiver's transmission chain and reception chain have to be capable of transmitting and receiving signals at the same time. However, when operating in full-duplex mode a signal output from a transmission chain may saturate a reception chain unless the reception chain can filter out the transmitted signal before it reaches a LNA-mixer within the reception chain. Furthermore, wide-band noise from the transmission chain may affect signal-to-noise ratio of a received signal unless the amplitude of the transmitted signal can be kept at or below the thermal noise floor.

While a duplex filter provides for sufficient isolation between a transmission chain and a reception chain, duplex filters result in a significant power loss to a transmitted signal. For example, duplex filters comprising bandpass filters typically have a transmitter insertion loss in a range of approximately 2-4 dB. The insertion loss of the bandpass filters requires a transmission chain to deliver more power than what is actually output by an antenna. For example, in a 3G system a duplex filter may increase the output of the transmission chain by 100-200 mW to transmit a 200-300 mW signal. Such an increase in output power is undesirable since it reduces the battery life of an associated mobile communication device.

Accordingly, the present disclosure relates to transceiver system having a bypass signal path that enables low power consumption. The transceiver system comprises a transmission path and a reception path. The transmission path is configured to provide a signal from a transmission chain to an antenna for wireless transmission. The reception path is configured to provide a signal from the antenna to a reception chain. A duplex filter configured to provide isolation between the transmission and reception paths is connected between the antenna and the transmission and reception paths. A bypass signal path is configured to selectively exchange signals between the transmission chain and the antenna along a conductive path that bypasses the duplex filter. By using the bypass signal path to selectively exchange signals between the transmission chain and the antenna the insertion loss of the duplex filter can be mitigated, allowing for the transceiver system to operate at a lower power.

Figure 2A:
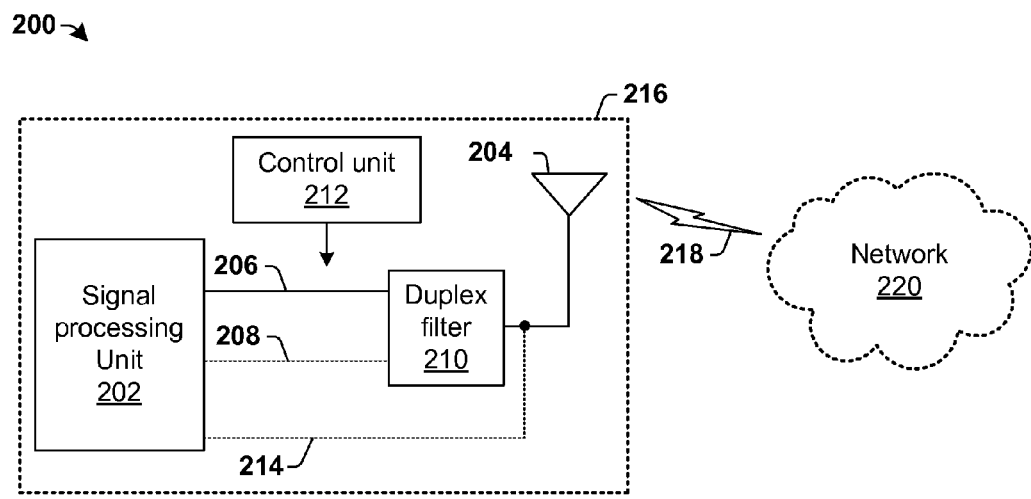
FIG. 2A is a block diagram illustrating a disclosed transceiver system having a signal path that bypasses the duplex filter.

FIG. 2A is a block diagram illustrating of an example of a disclosed transceiver system 200 having a bypass signal path 214 configured to selectively bypass a duplex filter 210. The transceiver system 200 may comprise a mobile communication device 216 (e.g., mobile handset) configured to operate as a LTE-FDD (Long Term Evolution frequency division duplexing) system. The transceiver system 200 may alternatively comprise a mobile communication device 216 configured to operate as a different system, such as a GSM, for example.

The transceiver system 200 comprises a signal processing unit 202 in communication with an antenna 204. The antenna 204 is configured to transmit and receive wireless signals 218 (e.g., to and from a network 220). The signal processing unit 202 is configured to generate signals that are provided to the antenna 204 for transmission and to process signals received from the antenna 204.

A first signal path 206 and a second signal path 208 extend between the signal processing unit 202 and the antenna 204.

The first and second signal paths, 206 and 208, are configured to exchange data between the signal processing unit 202 and the antenna 204. In some examples, the first signal path 206 comprises a transmission path configured to provide a signal to be transmitted from the signal processing unit 202 to the antenna 204 for wireless transmission and the second signal path 208 comprises a reception path configured to provide a received signal from the antenna 204 to the signal processing unit 202. In other examples, the first signal path 206 comprises a reception path and the second signal path 208 comprises a transmission path.

A duplex filter 210 is located between the first and second signal paths, 206 and 208, and the antenna 204. The duplex filter 210 is configured to provide isolation between the first signal path 206 and the second signal path 208 by preventing signals (e.g., noise) from one signal path from entering the other signal path. For example, during operation of the first signal path 206, the duplex filter 210 may provide isolation by filtering signals in the operating frequency of the first signal path 206 from entering into the second signal path 208. Similarly, during operation of the second signal path 208, the duplex filter 210 may provide isolation by filtering signals in the operating frequency of the second signal path 208 from entering into the first signal path 206.

A control unit 212 is configured to control operation the first and second signal paths, 206 and 208. The control unit 212 is configured to activate one or more signal paths to exchange a signal between the signal processing unit 202 and the antenna 204. The control unit 212 may activate the signal paths (i.e., operate to convey a signal) at a same time and/or at different times. For example, at some times the control unit 212 may operate in full duplex mode and concurrently activate the first and second signal paths, 206 and 208, while at other times the control unit 212 may activate the first signal path 206 and deactivate the second signal path 208.

A bypass signal path 214 extends between the signal processing unit 202 and the antenna 204 along a conductive path that bypasses the duplex filter 210. The bypass signal path 214 is configured to selectively exchange signals between the signal processing unit 202 and the antenna 204 at times when the duplex filter 210 is not needed to provide isolation between the first and second signal paths, 206 and 208 (i.e., when the control unit 212 is not operating in full duplex mode). For example, when the first signal path 206 is deactivated (i.e., operate not to convey a signal), the bypass signal path 214 may be used instead of the second signal path 208 to exchange signals between the signal processing unit 202 and the antenna 204 since the duplex filter 210 is not required to provide isolation between the first and second signal paths, 206 and 208.

Figure 2B:
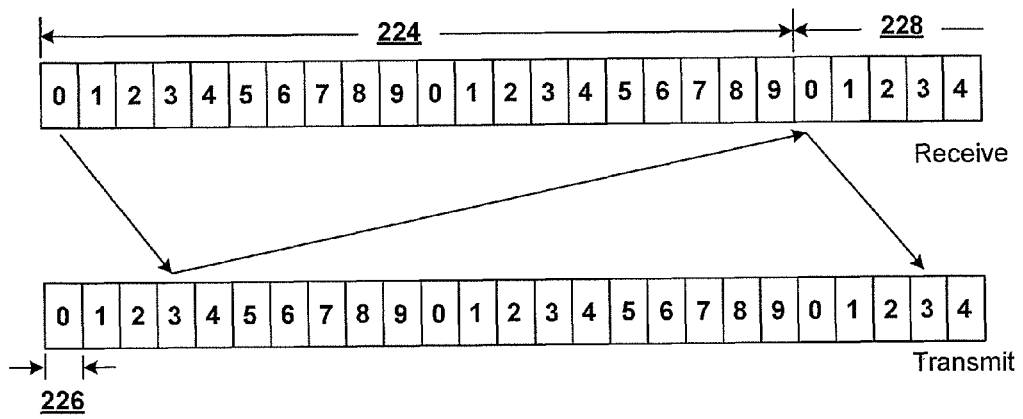
FIG. 2B illustrates a timing diagram showing an example of transmission and reception in an LTE-FDD system.

FIG. 2B illustrates an example of a timing diagram 222 showing transmission and reception for a mobile communication device 216 operating as a LTE-FDD system during a voice call.

As illustrated in timing diagram 222, LTE-FDD systems utilize a communication infrastructure having frames 224, 228 with a 20 mS span. Each frame 224, 228 is further divided into 20 sub-frames or time-slots 226 with a 1 mS span. A mobile communication device 216 operating with the LTE-FDD dynamically allocates one or more time-slots 226 for reception and transmission, such that up-link and down-link communication take place during an allocated time-slot 226 (e.g., having a 1 ms duration).

In such a system, a first signal path 206 comprising a reception chain and a second signal path 208 comprising a transmission chain are activated (i.e., powered up to transmit or receive signals) at different times according to allocated time-slots 226. For example, to conserve power the mobile communication device 216 may deactivate/power down a reception chain in timeslots where a network 220 is not sending data to the mobile communication device 216.

In timing diagram 222, the mobile communication device 216 is configured to receive a data package from the network 220 in time-slot 0. To receive the data package during the time slot 0, the reception chain is powered up in time-slot 0. However, after a delayed time period (e.g., to account for propagation delay, analysis of the packet to ensure it is not damaged, etc.) within receiving the data package, the reception chain is powered down until it is used again in a subsequent frame. At time-slot 3, the mobile communication device 216 is configured to send an acknowledgement to the network 220 that it has received the data package. To send the acknowledgement, the transmission chain is powered up in time-slot 3. After the first frame 224 ends, the process is repeated during a subsequent frame 228, and the mobile communication device 216 receives another data package at time-slot 0 of frame 228.

Therefore, between time slot 3 and the end of the frame 224, the reception chain is deactivated to save power. During this time, the duplex filter 210 is not needed to provide for isolation between transmission chains and reception chains and the bypass signal path 214 may be used to provide a signal between the antenna 204 and the signal processing unit 202. By using the bypass signal path 214 to provide a signal from the signal processing unit 202 to the antenna 204, the insertion loss of the duplex filter 210 (e.g., approximately 3.5 dB) is avoided allowing the transceiver system 200 to reduce current consumption and conserve power.

It will be appreciated that FIG. 2B is a non-limiting example of a timing diagram to which the disclosed transceiver system may be applied. For example, a timing diagram associated with the disclosed transceiver system may have additional transmitted or received signals within a frame (e.g., may have acknowledgement from the network 220 to the mobile communication device 216).

Furthermore, although FIG. 2B illustrates an exemplary timing diagram pertaining to a LTE-FDD system operating a voice call, it will be appreciated that he disclosed transceiver system is not limited to voice calls. Rather, the disclosed transceiver system may be applied to any system having the capability to operate in a full duplex mode, but which transmits and receives data at separate times at some point during operation.

For example, in IP traffic, data having a given size (e.g., 500 kB) is exchanged between a mobile communication device and a network (e.g., the internet). The data may be packaged by a host computer into plurality of packages with a header added for each timeslot. The mobile communication device can receive a package in one timeslot (with high bandwidth) or in multiple timeslots (with lower bandwidth). For example, for general IP-traffic it is up to a network to allocate resource blocks to each mobile communication device, however since there is a lower overhead in transmitting n resource blocks in one timeslot than transmitting one resource block in multiple timeslots it is logical to transmit an IP packet to a mobile communication device in a single time-slot. In many protocols the host computer will not send new data until an acknowledgement is received from the mobile communication device, consequently data is not received in every time slot and therefore the transmission path and reception path will often operate at separate times.

Figure 3A:
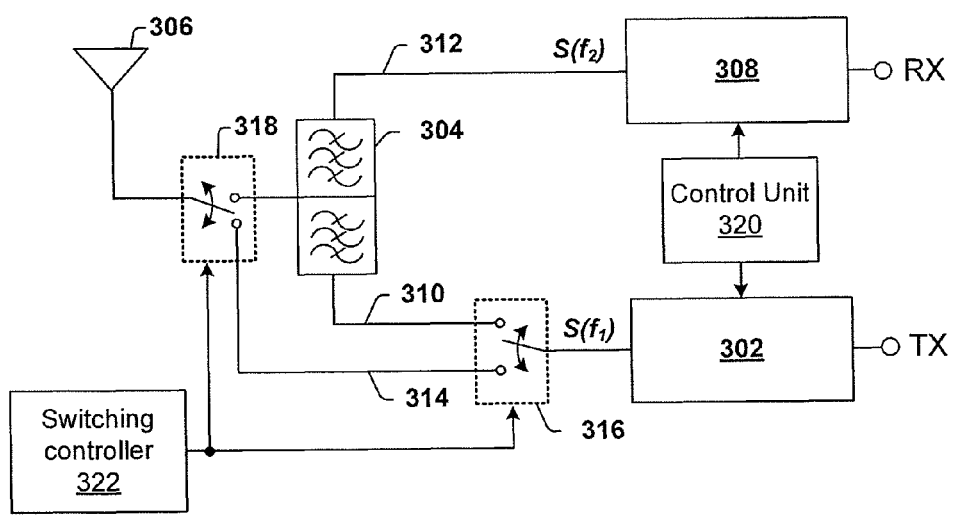
FIGS. 3A-3B illustrates a more detailed transceiver system having an alternative transmission path that bypasses the duplex filter.
Figure 3B:
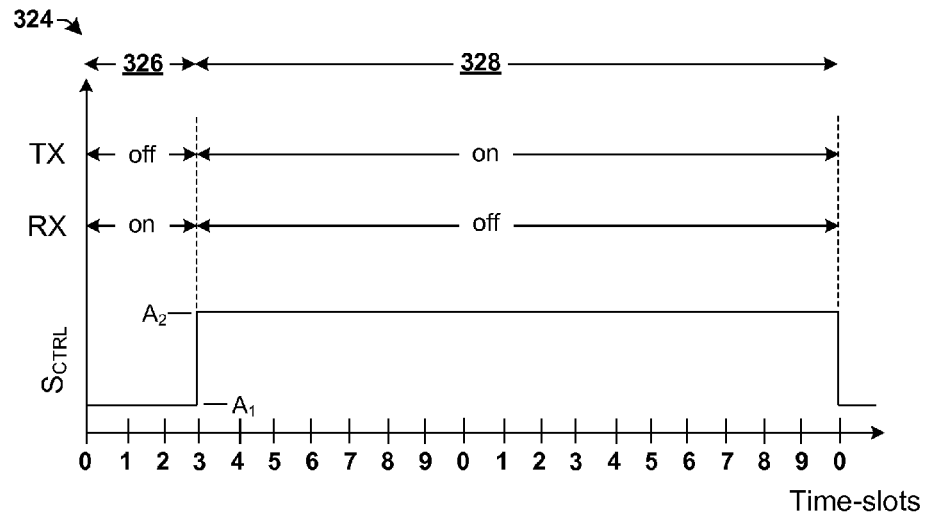

FIGS. 3A-3B illustrates a more detailed example of a disclosed transceiver system having an alternative bypass signal path that bypasses a duplex filter.

FIG. 3A is a block diagram illustrating a disclosed transceiver system 300 having a bypass signal path 314 that bypasses a duplex filter 304 located between a transmission chain 302 and an antenna 306.

The transceiver system 300 comprises a transmission chain 302 and a reception chain 308, respectively connected to an antenna 306 by way of transmission path 310 and a reception path 312. The transmission chain 302 is configured to output a signal having a first frequency $S(f_1)$ to the antenna 306 for wireless transmission. The reception chain 308 is configured to receive a signal from the antenna 306 having a second frequency $S(f_2)$ that is different than the first frequency $f_1$. A duplex filter 304 is connected between the transmission path 310 and the reception path 312. The duplex filter 304 is configured to provide for isolation between the transmission and reception paths, 310 and 312, as described above.

A bypass signal path 314 acts as an alternative transmission path that bypasses the duplex filter 304. The bypass signal path 314 has a first end selectively connected to the transmission chain 302 at a position upstream of the duplex filter 304 by a first switching element 316. The bypass signal path 314 has a second end selectively connected to the antenna 306 at a position downstream of the duplex filter 304 by way of a second switching element 318. The bypass signal path 314 is configured to selectively exchange signals between the transmission chain 302 and the antenna 306 in a manner that bypasses the duplex filter 304. In some cases, the bypass signal path 314 path extends between a power amplifier in the transmission chain 302 and the antenna 306, so as to directly connect the power amplifier directly to the antenna 306.

A control unit 320 is configured to control operation of the transmission and reception chains, 302 and 308. The control unit 320 is configured to activate (i.e., operate to convey a signal) one or more of the transmission and reception chains, 302 and 308, to transmit and/or receive a signal to/from the antenna 306. The control unit 320 may activate the transmission and reception chains, 302 and 308, at a same time (in full duplex mode) and/or at different times.

A switching controller 322 is configured to generate one or more control signals $S_{TCRL}$ that operate the first and second switching elements, 316 and 318. The switching controller 322 is configured to connect the transmission chain 302 to antenna 306 by way of transmission path 310 when the reception chain 308 is activated. The switching controller 322 is further configured to connect the transmission chain 302 to antenna 306 by way of bypass signal path 314 when the transmission chain 302 is activated and the reception chain 308 is deactivated.

In some examples, the control signal $S_{TCRL}$ may comprise a signal having a periodic waveform that is configured to periodically operate the switching elements 316 and 318. For example, in an LTE voice-call where a handset uses semi-persistent scheduling with exchange of voice data at 20 ms intervals (described above in FIG. 2B), the control signal $S_{CTRL}$ is configured to periodically operate switching elements 316 and 318 to bypass the duplex filter 304 when the reception chain 308 is deactivated. In other examples, the control signal $S_{TCRL}$ may comprise a signal having a non-periodic waveform. For example, the disclosed bypass path may be applied to general IP traffic wherein the data received from a host varies in size and the number of time slots in which it is received.

FIG. 3B is a timing diagram 324 showing operation of transceiver system 300.

During a first time period 326, when the reception chain 308 is activated, the control signal $S_{CTRL}$ has a first value $A_1$. The first value $A_1$ of the control signal $S_{CTRL}$ corresponds to a state of switching elements 316 and 318 that connects the transmission chain 302 to the antenna 306 by way of the transmission path 310, which contains the duplex filter 304. During a second time period 328, when the transmission chain 302 is activated and the reception chain 308 is deactivated, the value of the control signal $S_{CTRL}$ changes from the first value $A_1$ to a second value $A_2$. The second value $A_2$ of the control signal $S_{CTRL}$ corresponds to a state of switching elements 316 and 318 that connects the transmission chain 302 to the antenna 306 by way of the bypass signal path 314.

Therefore, since reception chain 308 is not active in all time slots, the disclosed transceiver system 300 significantly lowers current consumption by using the bypass signal path 314 to provide signals from the transmission chain 302 to the antenna 306 during timeslots where the reception chain 308 is not active.

Figure 4:
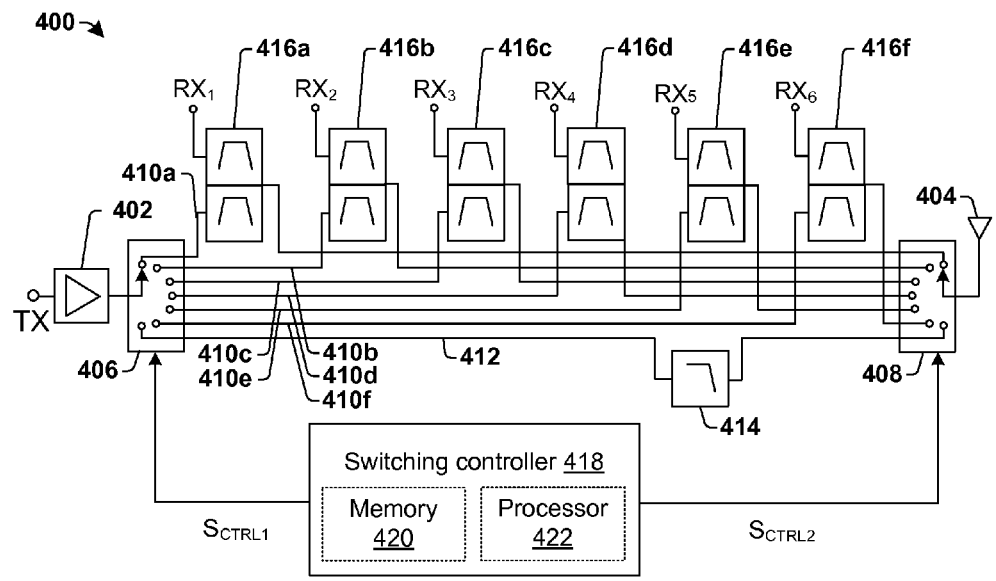
FIG. 4 illustrates a block diagram of a transmission path comprising an alternative transmission path that bypasses the duplex filter.

FIG. 4 illustrates a block diagram of a multi-band transceiver 400 comprising a bypass signal path 412 that acts as an alternative transmission path that bypasses the duplex filters 416.

Transceiver 400 comprises a plurality of transmission paths 410a-410e extending between a power amplifier 402 and an antenna 404. The plurality of transmission paths 410 are configured to transmit signals at different frequency bands having a different transmit frequencies, so that the transmitter 400 is able to operate as a multi-band transmitter configured to transmit electromagnetic radiation at a variety of different frequencies. For example, the transceiver 400 contains a first transmission path 410a configured to transmit signals at a first frequency band, a second transmission path 410b configured to transmit signals at a second frequency band, etc. The different frequencies may be used by different wireless standards (e.g., GSM, TMDA, CMDA, etc.). Alternatively, the different frequencies may be used by different frequencies of a same wireless standard (e.g., to support multiple LTE FDD networks running at different 3GPP bands used in Europe, Asia and America like LTE bands B13, B17, B20, B26 etc.).

The transceiver 400 further comprises multiple duplex filters 416a-416f. Each transmission path 410a-410e is connected to a duplex filter 416a-416f by way of a first switching element 406. The duplex filters 416a-416b are configured to provide for isolation between a transmission path 410m (where m=a-f) and an associated reception path $RX_n$ (where n=1-6) for separate frequency bands. For example, the first transmission path 410a is connected to a first duplex filter 416a that is configured to provide for isolation between the first transmission path 410a and a first reception path $RX_1$, the second transmission path 410b is connected to a second duplex filter 416b that is configured to provide for isolation between the second transmission path 410b and a second reception path $RX_2$, etc.

The outputs from the duplex filters 416a-416f are connected to the antenna 404 by way of a second switching element 408. Together, the first and second switching elements, 406 and 408, are configured to selectively connect the power amplifier 402 to the antenna 404 by way of a transmission path 410 having an appropriate duplex filter for an active frequency band.

A bypass signal path 412 extends between the power amplifier 402 and the antenna 404 by way of the first and second switching elements, 406 and 408. Connecting the bypass signal path 412 to the first and second switching elements, 406 and 408, allows for the bypass signal path 412 to be shared between the plurality of frequency bands of the multi-band transceiver 400. The bypass signal path 412 may comprise a low pass filter 414. The low pass filter 414 is configured to remove out of band noise (e.g., to remove harmonics of transmitted signals).

A switching controller 418 is configured to control operation of the switching elements, 406 and 408. The switching controller 418 may comprise a memory element 420 configured to store data corresponding to transmit and receive timing (e.g., timeslots at which a data packet is transmitted or received). The memory element 420 may be accessed by a processor 422 configured to access the data and to generate one or more control signals $S_{CTRL}$ based thereupon.

During operation, the switching controller 418 operates switching elements 406 and 408 to activate one of the plurality of transmission paths 410a-410e. When operating in full duplex mode (i.e., having a transmission path and reception path simultaneously operating), the switching elements 406 and 408 are configured to selectively connect the power amplifier 402 to the antenna 404 by way of one of the transmission paths 410a-410f according to a desired frequency of transmission. When not operating in full duplex mode, the switching elements 406 and 408 are configured to connect the power amplifier 402 to the antenna 404 by way of the bypass signal path 412.

Figure 5:
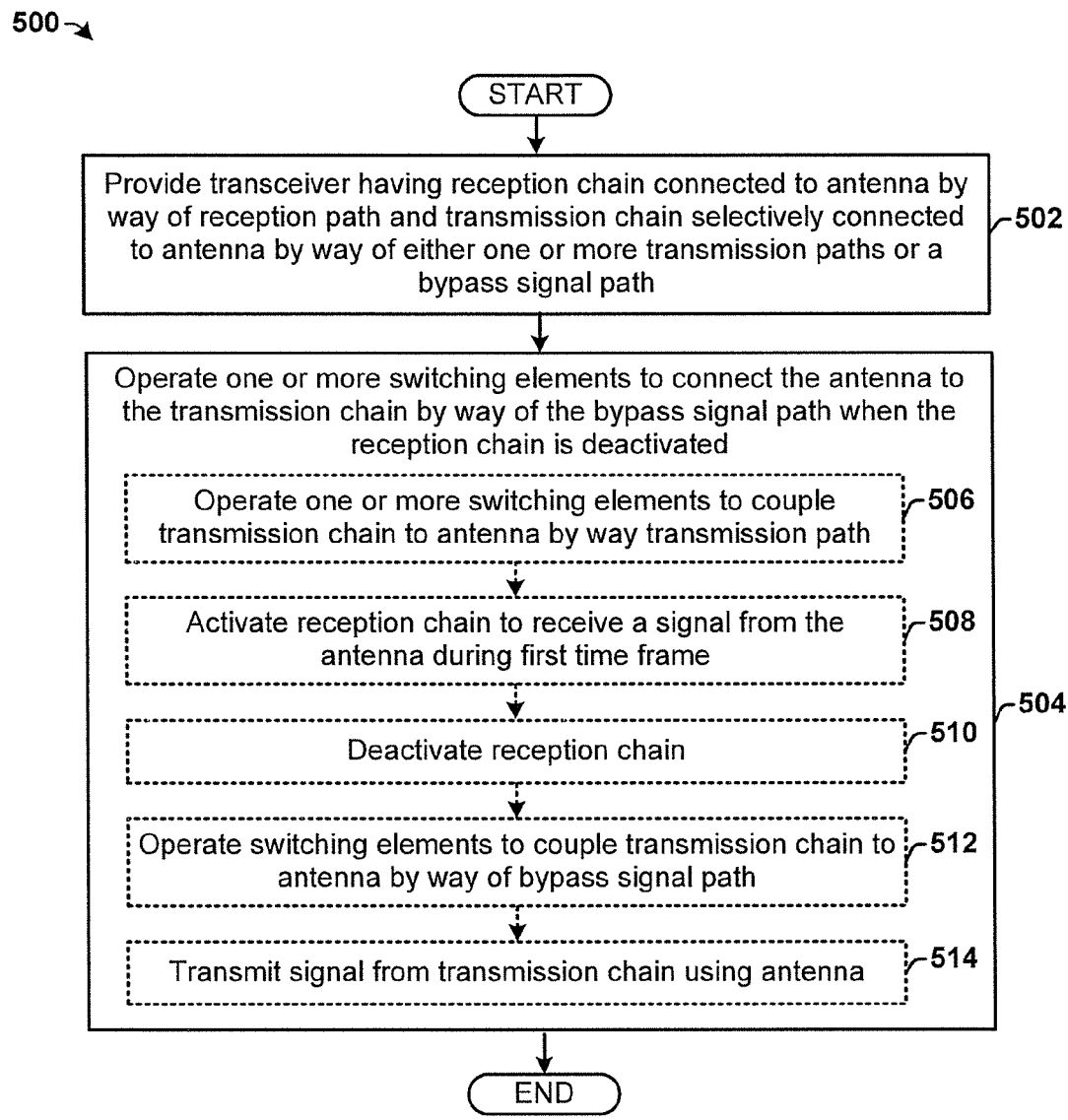
FIG. 5 is a flow diagram of an exemplary method reducing insertion loss in a transceiver system.

FIG. 5 is a flow diagram 500 of an exemplary method reducing insertion loss in a transceiver system While the disclosed method 500 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects of the description herein. Further, one or more of the acts depicted herein may be carried out in one or more separate acts and/or phases At 502, a transceiver having a reception chain and a transmission chain connected to an antenna is provided. The receiver chain is connected to the antenna by way of a reception path having a duplex filter. The transmission chain is selectively connected to the antenna by way of either one or more transmission paths having a duplex filter or an alternative, bypass signal path that connects the transmission chain to the antenna along a conductive path that bypasses the one or more duplex filters.

At 504 one or more switching elements are operated to connect the antenna to the transmission chain by way of the bypass signal path when the reception chain is deactivated.

For example, at 506, one or more switching elements are operated to couple the transmission chain to the antenna by way of a transmission path (i.e., by way of a duplex filter).

At 508, a reception chain is activated to receive a signal from the antenna. Since the transmission chain is connected to the antenna by way of one or more duplex filters, isolation is achieved between the reception chain and the transmission chain.

At 510, the reception chain is deactivated.

At 512, the one or more switching elements are operated to couple the transmission chain to the antenna by way of the alternative, bypass signal path. The bypass signal path by-passes the duplex filter. The duplex filter can be safely bypassed since the reception chain is deactivated, and therefore the duplex filter is no longer needed to provide for isolation between the transmission chain and the reception chain.

At 514, a signal is transmitted from the transmission chain using the antenna.

Figure 6:
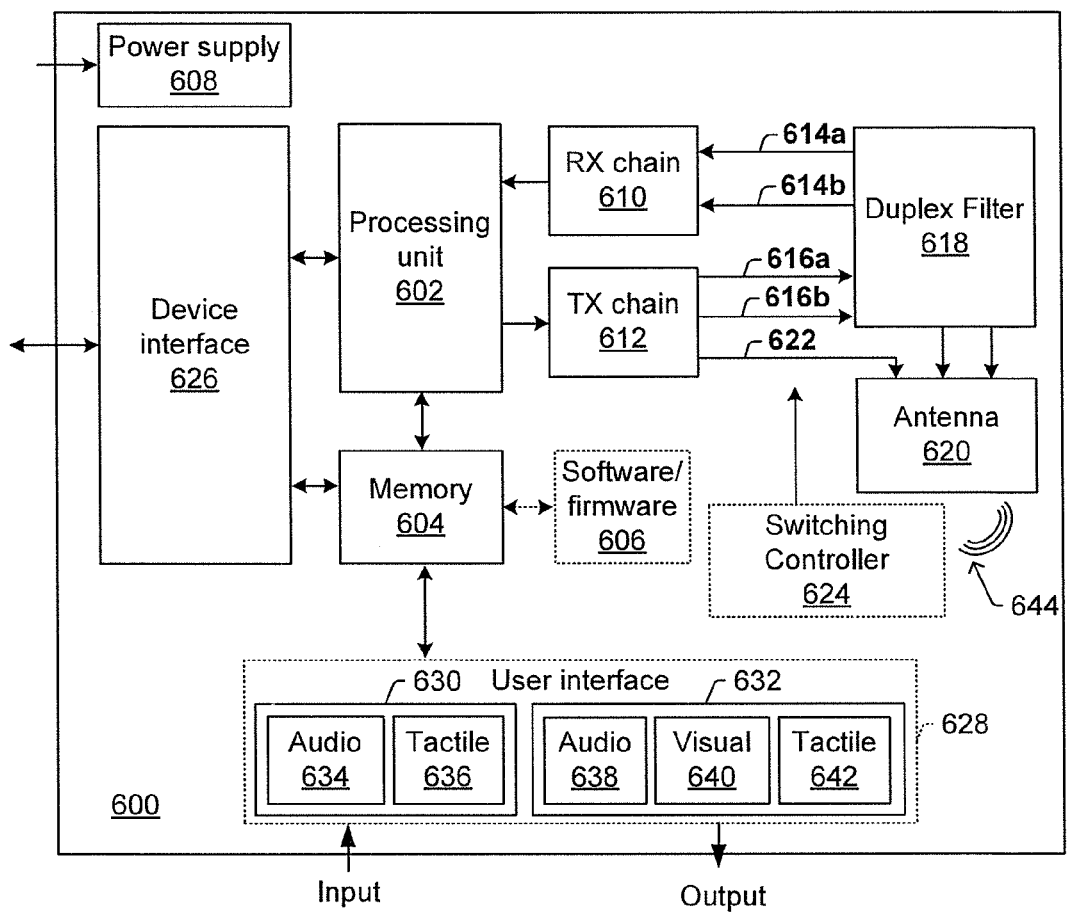
FIG. 6 illustrates an example of a mobile communication device.

FIG. 6 illustrates an example of a mobile communication device 600, such as a mobile phone handset for example. Mobile communication device 600 includes at least one processing unit 602 and memory 604. Depending on the exact configuration and type of mobile communication device, memory 604 may be volatile (such as RAM, for example), non-volatile (such as ROM, flash memory, etc., for example) or some combination of the two. Memory 604 may be removable and/or non-removable, and may also include, but is not limited to, magnetic storage, optical storage, and the like. In some examples, computer readable instructions in the form of software or firmware 606, which are configured to implement one or more examples provided herein, may be stored in memory 604. The computer readable instructions may be loaded in memory 604 for execution by processing unit 602. Other peripherals, such as a power supply 608 (e.g., battery) may also be present.

Processing unit 602 and memory 604 work in coordinated fashion to wirelessly communicate with other devices by way of a wireless communication signal 644 (e.g., that uses frequency modulation, amplitude modulation, phase modulation, and/or combinations thereof to communicate signals to another wireless device). To facilitate this wireless communication, an antenna 620 is coupled to the processing unit 602 by way of a reception chain 610 and a transmission chain 612. One or more reception paths 614 connect the reception chain 610 to the antenna 620 by way of one or more duplex filters 618. One or more transmission paths 616 connect the transmission chain 612 to the antenna 620 by way of the one or more duplex filters 618. A bypass signal path 622 further connects the transmission chain 612 to the antenna 620 along a conductive path that bypasses the duplex filters 618.

A switching controller 624 is configured to selectively connect the transmission chain 612 to the antenna 620 by way of either the transmission paths 616 or the bypass signal path 622 depending on a state of the reception chain 610. For example, if the reception chain 610 is activated the switching controller 624 connects the transmission chain 612 to the antenna 620 by way of the transmission paths 616, while if the reception chain 610 is deactivated switching controller 624 connects the transmission chain 612 to the antenna 620 by way of the bypass signal path 622.

To improve a user's interaction with the mobile communication device 600, the mobile communication device 600 may include a number of interfaces that allow the mobile communication device 600 to exchange information with the external environment. These interfaces may include one or more user interface(s) 620, and one or more device interface(s) 626, among others.

If present, user interface 628 may include any number of user inputs 630 that allow a user to input information into the mobile communication device 600, and may also include any number of user outputs 632 that allow a user to receive information from the mobile communication device 600. In some mobile phones, the user inputs 630 may include an audio input 634 (e.g., a microphone) and/or a tactile input 636 (e.g., push buttons and/or a keyboard). In some mobile phones, the user outputs 632 may include an audio output 638 (e.g., a speaker), a visual output 640 (e.g., an LCD or LED screen), and/or tactile output 642 (e.g., a vibrating buzzer), among others.

Device interface 626 may include, but is not limited to, a modem, a Network Interface Card (NIC), an integrated network interface, a radio frequency transmitter/receiver, an infrared port, a USB connection, or other interfaces for connecting mobile communication device 600 to other devices. Device connection(s) may include a wired connection or a wireless connection. Device connection(s) may transmit and/or receive communication media.

Although the disclosure has been shown and described with respect to one or more implementations, equivalent alterations and modifications will occur to others skilled in the art based upon a reading and understanding of this specification and the annexed drawings. Further, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A transceiver system, comprising:
a first signal path comprising a plurality of transmission paths respectively configured to convey signals at different frequencies between an antenna port and a signal processing unit;
a second signal path comprising a plurality of reception paths respectively configured to convey signals at different frequencies between the antenna port and the signal processing unit;
a plurality of duplex filters, wherein each duplex filter is connected between a respective one of the transmission paths and a respective one of the reception paths, wherein each one of the plurality of duplex filters is configured to provide isolation between the respective one of the transmission paths and the respective one of the reception paths;
a bypass signal path configured to be selectively connected between the antenna port and the signal processing unit along a conductive path that by-passes the duplex filters;
a first switching element having an input connected to a power amplifier and a plurality of outputs corresponding to a first end of the plurality of transmission paths and the bypass signal path, respectively;
a second switching element having a plurality of inputs corresponding to a second, opposite end of the plurality of transmission paths and the bypass signal path, respectively, and an output connected to the antenna port; and
a switching controller configured to generate one or more control signals that operate the first switching element and the second switching element;
wherein the one or more control signals comprise periodic waveforms repeating at identical intervals; and
wherein the first switching element and the second switching element are configured to switch the power amplifier and the antenna port between each one of the plurality of transmission paths and the bypass signal path, respectively.

2. The transceiver system of claim 1,
wherein the first signal path comprises a transmission chain configured to provide a signal to be transmitted to the antenna for wireless transmission; and
wherein the second signal path comprises a reception chain configured to receive a received signal from the antenna.

3. The transceiver system of claim 1, wherein the first and second switching elements are configured to selectively connect the signal processing unit to the antenna port by way of either the bypass signal path or one of the plurality of the transmission paths.

4. The transceiver system of claim 2, wherein the switching controller is configured to generate the one or more control signals that operate the first and the second switching elements to connect the transmission chain to the antenna port by way of one of the plurality of the transmission paths when the reception chain is operated to convey the received signal and by way of the bypass signal path when the reception chain is operated to not convey the received signal.

5. The transceiver system of claim 4, wherein the switching controller comprises:
a memory element configured to store data corresponding to a transmit and receive timing; and
a processor configured to access the data and to generate the one or more control signals based thereupon.

6. The transceiver system of claim 2,
wherein the transmission chain comprises the power amplifier; and
wherein the bypass signal path extends from a first position downstream of the power amplifier and upstream of the duplex filters to a second position downstream of the duplex filters.

7. The transceiver system of claim 1, wherein the bypass signal path comprises a low pass filter.

8. The transceiver system of claim 1, wherein the transceiver system comprises a LTE-FDD (Long Term Evolution frequency division duplexing) system.

9. A transceiver, comprising:
a transmission chain configured to provide a signal to be transmitted to an antenna port for wireless transmission;
a reception chain configured to receive a received signal from the antenna port;
a plurality of transmission paths respectively configured to convey signals at different frequencies between the transmission chain and the antenna port;
a plurality of reception paths respectively configured to convey a received signals at different frequencies between the antenna port and the reception chain;
a plurality of duplex filters, wherein each duplex filter is connected between a respective one of the transmission paths and a respective one of the reception paths and configured to provide isolation between the respective one of the transmission paths and the respective one of the reception paths;

a control unit configured to operate the transmission chain and the reception chain at a same time and at separate times;

a bypass signal path configured to be selectively connected between the transmission chain and the antenna port along a conductive path that bypasses the duplex filters;

a first switching element having an input connected to a power amplifier in the transmission chain and a plurality of outputs corresponding to a first end of the plurality of transmission paths and the bypass signal path, respectively;

a second switching element having a plurality of inputs corresponding to a second, opposite end of the plurality of transmission paths and the bypass signal path, respectively, and an output connected to the antenna port; and a switching controller configured to generate one or more control signals that operate the first switching element and the second switching element;

wherein the one or more control signals comprise periodic waveforms repeating at identical intervals; and wherein the first switching element and the second switching element are configured to switch the power amplifier and the antenna port between each one of the plurality of transmission paths and the bypass signal path, respectively.

10. The transceiver of claim 9, wherein the switching controller is configured to generate the one or more control signals that operate the first and second switching elements to connect the transmission chain to the antenna port by way of one of the plurality of transmission paths when the reception chain is operated to convey the received signal and by way of the bypass signal path when the reception chain is operated not to convey the received signal.

11. The transceiver of claim 9,
wherein the transmission chain comprises the power amplifier; and
wherein the bypass signal path extends from a first position downstream of the power amplifier and upstream of the duplex filters to a second position downstream of the duplex filters.

12. The transceiver of claim 9, wherein the bypass signal path comprises a low pass filter.

13. A method of reducing insertion loss in a transceiver system, comprising:
providing a transceiver having a reception chain connected to an antenna port by way of a plurality of reception paths and a transmission chain selectively connected to the antenna port by either one of a plurality of transmission paths that connect the antenna port by way of a respective duplex filter or a bypass signal path that connects to the antenna port by way of a conductive path that bypasses the duplex filters; and operating a first switching element and a second switching element to connect the antenna port to the transmission chain by way of the bypass signal path when the reception chain is operated not to convey a received signal based on one or more control signals from a switching controller, wherein the one or more control signals comprise periodic waveforms repeating at identical intervals;

wherein the first switching element has an input connected to a power amplifier in the transmission chain and a plurality of outputs corresponding to a first end of the plurality of transmission paths and the bypass signal path, respectively, and the second switching element has a plurality of inputs corresponding to a second, opposite end of the plurality of transmission paths and the bypass signal path, respectively, and an output connected to the antenna port; and wherein the first switching element and the second switching element are configured to switch the power amplifier and the antenna port between each one of the plurality of transmission paths and the bypass signal path, respectively.

14. The method of claim 13, wherein operating the first switching element and the second switching element to connect the antenna port to the transmission chain by way of the bypass signal path when the reception chain is operated not to convey the received signal further comprises:
operating the first and the second switching elements to couple the transmission chain to the antenna port by way of one of the plurality of transmission paths;
operating the reception chain to receive a signal from the antenna port during a first time-slot;
operating the reception chain to not convey the signal from the antenna port during a subsequent time-slot;
operating the first and the second switching elements to couple the transmission chain to the antenna port by way of the bypass signal path, after operating the reception chain to not convey the signal from the antenna port; and
transmitting a signal from the transmission chain along the bypass signal path to the antenna port during the subsequent time-slot.

15. The method of claim 13, wherein the transceiver comprises a LTE-FDD (Long Term Evolution frequency division duplexing) system.

* * * * *